United States Patent [19]

Dye

[11] Patent Number: 4,872,051
[45] Date of Patent: Oct. 3, 1989

[54] COLLISION AVOIDANCE ALARM SYSTEM

[75] Inventor: Robert H. Dye, Ann Arbor, Mich.

[73] Assignee: Environmental Research Institute of Michigan, Ann Arbor, Mich.

[21] Appl. No.: 103,202

[22] Filed: Oct. 1, 1987

[51] Int. Cl.$^4$ ............................................. H06N 7/18
[52] U.S. Cl. ................................. 358/103; 358/105; 358/107; 358/125
[58] Field of Search ............... 358/105, 103, 107, 125; 340/963, 961; 342/29, 41, 55

[56] References Cited

U.S. PATENT DOCUMENTS

| | | | |
|---|---|---|---|
| 3,636,330 | 1/1972 | Holeman | 382/31 |
| 4,257,703 | 3/1981 | Goodrich | 358/105 |
| 4,288,050 | 9/1981 | Gauggel | 244/3.16 |
| 4,344,146 | 8/1982 | Davis | 382/1 |
| 4,512,000 | 4/1985 | Masuko | 340/552 |

OTHER PUBLICATIONS

Tsukiyama et al, *Pattern Recognition*, vol. 18, Nos. 3/4, pp. 207–213 (1985) "Detection of the Movements of Persons from a Sparse Sequence of TV Images".

*Primary Examiner*—Howard W. Britton
*Attorney, Agent, or Firm*—Krass & Young

[57] ABSTRACT

The following invention is a passive collision avoidance alarm system. An optical sensor (which may optionally be visable, infrared or ultraviolet) is disposed to provide a continuous raster scan of the scene within a wide angle of the direction of travel of the vehicle. This sensor output is converted into digital data and stored. A computer system compares consecutive scenes to detect identifiable objects. For such identifiable objects the computer calculates the centroid of the object and its angle, and a measure of the size or extent of the object. Detection of an object having a constant angle and a increasing measure of extent causes an alarm to be triggered.

14 Claims, 2 Drawing Sheets

COLLISION AVOIDANCE ALARM SYSTEM

BACKGROUND OF THE INVENTION

The present invention relates to an object detecting apparatus for detecting the presence of an object and determining if this object is on a collision course with a platform carrying the apparatus.

Object detecting systems are well-known in the literature. However, such systems have heretofore been applied to comparing an observed scene with either an earlier view of the scene retained in memory or a standard scene image retained in memory. Variations on such systems are used to guide missiles to infra-red "hot spots", often by proportional navigation based on line of sight change rates, and, in other variations, by a sequence of return signals reflected by the object from a sequence of signals transmitted by the system.

A surveillance system employing such an object detecting apparatus is described in U.S. Pat. No. 4,257,063 to Loughry, et al. In this apparatus, a television camera sans the desired scene in a known raster fashion in a series of image frames, producing an amplitude modulated video signal describing the energy intensity distribution of the scene. Clocking and gating circuitry triggered in synchronism with the television camera synchronization signals defines a set of predetermined discrete spaced locations of the raster during each image frame and samples the video signal amplitude at each of the defined locations. The same discrete locations are sampled during each frame. By appropriate storing the video amplitude signals, a profile of the amplitude distribution of the video samples taken during each frame may be produced. By comparing successive amplitude profiles at an appropriately determined and adjusted threshold, the appearance of an object into the scene may be detected.

A video inspection system, as described in U.S. Pat. No. 4,344,146 to Davis, Jr., et al, provides for digitizing the video signals produced by a television camera observing a scene and assigning a digital value to each "pixel" or elemental part of the overall picture. These values are then stored in a digital memory and are available for comparison processing by a digital computer either with a stored "standard" scene or with a subsequently digitized representation of the scene. Each pixel is compared with its corresponding time sequence of digital values.

An "active" object detection system is described in U.S. Pat. No. 4,512,000 to Masuko. A "passive" steering device system is described in U.S. Pat. No. 4,288,050 to Gauggel. U.S. Pat. No. 3,636,330 to Holeman, et al, describes a navigational system wherein a viewed scene is compared optically with a hologram produced to establish an inertial reference.

Recognizing the technology represented by the above-referenced sample of patents, the present invention is addressed to a simpler, yet possibly more complex problem. In maritime navigation and the operation of watercraft of all sorts, one of the principal concerns is that of collision with another craft. This is particularly true for the operation of small craft, normally in short waters. Among small craft, the problem is exceptionally serious for craft operating under sail, with their inherently reduced visibility caused by the disposition of the sails.

The usual criteria for determining if another craft is on a collision course with the craft on which an observer is stationed is to note the "angle on the bow" of the other craft at sequential increments of time. If the "angle on the bow" does not change over time, three conditions are possible. Either the two craft are diverging, they are on parallel courses at equal speed, or they are on a collision course. Only if the apparent size of the other craft is observed to increase over time does the collision course condition exist.

While the above illustration and the herein described preferred embodiment of the invention consider primarily the watercraft application, it is apparent that a similar approach can yield a collision avoidance alarm system for motor vehicles, and, if three dimensional space is considered, for aircraft. Such systems ar further capable of triggering evasive action through an autopilot.

The primary factors that impact upon the requirements for an effective collision avoidance alarm system for small craft are, without ordering their importance: low cost, wide-angle sensor to sense a closing craft against a changing background, an ability to sense a closing craft of a variety of size parameters which may vary as headings change, and other factors that may become evident through the subsequent descriptions. Each of these factors appear unique when the prior art is considered.

SUMMARY OF THE INVENTION

Accordingly, an object of the present invention is to provide an apparatus for detecting the presence of any object on a collision course with a platform or vehicle carrying the apparatus and for generating an alarm upon such detection.

Another object of the present invention is to provide an apparatus capable of recognizing an object by its shape, and correlating said shape through changes in apparent size resulting from changes in distance separating the object from the apparatus.

A collision avoidance alarm system in accordance with the present invention includes, in a preferred embodiment, a television system for viewing a scene and for providing a plurality of electrical signals corresponding to, and representing the spatial distribution of radiation, such as visible light emanating from the scene. The optical system associated with the television system has a sufficiently wide field of view, centered on the direction of travel of a platform or vehicle bearing the alarm system, so as to include all objects reasonably visible that may be on a collision course with the platform. The television system, through its raster scanning techniques, provides, as part of the electronic signals generated, angular correlation information with respect to the line of travel of the platform. The electrical signals may then be processed by a neighborhood processing system that performs a correlation analysis between sequential views of the scene such that an object in the scene may be recognized from view to view despite changes in apparent size. When a correlation is found to be identifiable as an object maintaining a substantially constant bearing with respect to the direction of travel of the platform or vehicle carrying the alarm system, a concurrent apparent growth in the object can be used to generate a signal to an alarm circuit, thereby calling the attention of the user to a potential collision hazard.

A first alternative embodiment of the present system utilizes a wide-angle, infra-red sensing system in lieu of the television camera. The most basic of such systems uses a plurality of detectors, each sensing radiation originating from a corresponding discrete increment of the scene. The several detectors produce corresponding electrical signals which, represent the infra-red energy emanating from the scene. The electrical signals may then be processed by a neighborhood processing system to perform a correlation analysis similar to that of the preferred embodiment. Alternatively, a single infra-red detector element may be optically scanned across the scene, with the electrical signals resulting at a given time being representative of that portion of the scene than being scanned.

BRIEF DESCRIPTION OF THE DRAWINGS

The present invention is described with reference to the following drawings which form a part of the specification and wherein.

DETAILED DESCRIPTION OF A PREFERRED EMBODIMENT

Figure 1:
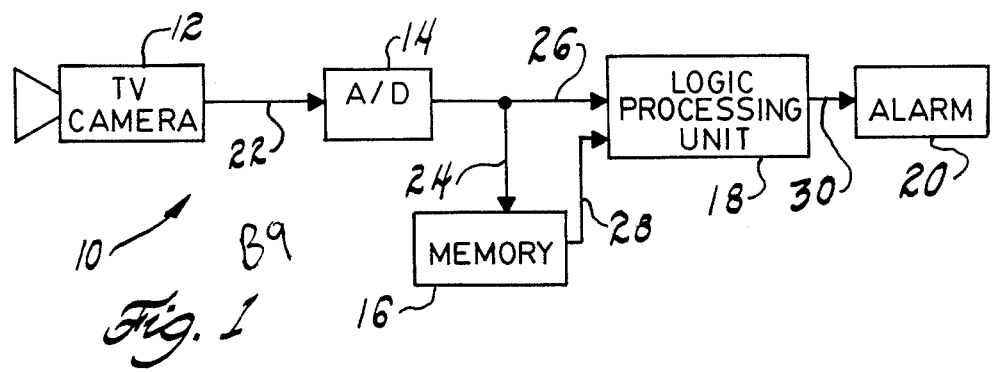
FIG. 1 is a functional block diagram of a preferred embodiment of a collision avoidance alarm system in accordance with the present invention.

Referring first to FIG. 1., a preferred embodiment of a collision avoidance alarm system in accordance with the present invention is shown generally at 10. The system 10 comprises a wide-angle television camera 12, an analog to digital converter 14, a memory 16, a logic processing unit 18, and an alarm 20.

Light radiation, in the form of electromagnetic waves generally within the visible region of the spectrum, incident at the lens of the television camera 12 are optically conducted through the television camera optics so as to be imaged upon the detector typically situated within the body of the camera 12. The detector is scanned in a raster fashion, as is well known in the art, as to produce a train of electrical signals directly correlatable to the incident light energy at each picture element of the raster scan pattern.

The train of electrical signals so generated is directed along a conduction path 22 to be input to an analog-to-digital converter 14 which serially digitizes the analog electrical signals to produce a time-sequenced set of digital signals which are also directly correlatable to the picture elements of the scene imaged by the television camera 12. The set of digital signals are sent to a memory unit 16 along a conduction path 24 and to a logic processing unit 18 along a conduction path 26.

The memory unit 16 retains the digital signals corresponding to the image of the viewed scene in addressable locations within the memory unit 16. Subsequent trains of digitized signals, from subsequent raster scans of the imaged scene, are buffered into the memory unit 16 and do not replace the digital information stored therein until the logic processing unit 18 indicates that processing is complete. In practice, the first set of digital information serves to initialize the memory unit 16.

The second set of digital information produced by the analog-to-digital converter 14 is the first set of information useable by the logic processing unit 18. The logic processing unit 18 calls for the digital information retained by the memory unit 16 to be transmitted from the memory unit 16 to the logic processing unit 18 along a conduction path 28 in a time-sequence corresponding to the receipt of digital information from the analog-to-digital converter 14 such that the logic processing unit 18 may make a comparison in digital values for each picture element of the viewed scene. Each picture element is identified as having either a "change" or "no change", and an indication of the direction of change to greater or lesser magnitude.

The logic processing unit 18 provides further analysis of the digital information by grouping digital values of similar magnitude to establish a geometric configuration for which a spatial centroid may computed. When consecutive centroids so computed appear to be at the same position within the imaged scene, the logic processing unit 18 generates a signal through a conduction path 30 to the alarm 20.

The alarm 20 is provided with an appropriate threshold to initiate an audible signal when the logic processing unit 18 has established that an object in the imaged scene is on an apparent collision course. A visual signal may also be produced by the alarm 20.

Figure 2A:
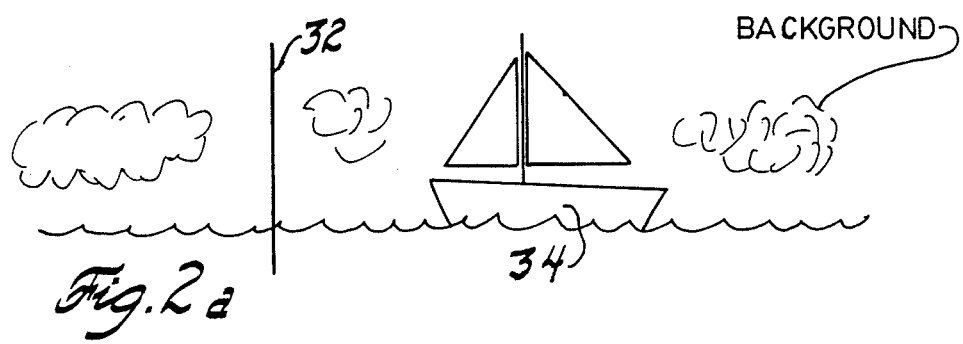
FIG. 2(a) is pictorial sketch of a scene illustrating an object therein as observed by the collision avoidance alarm system of the present invention.
Figure 2B:
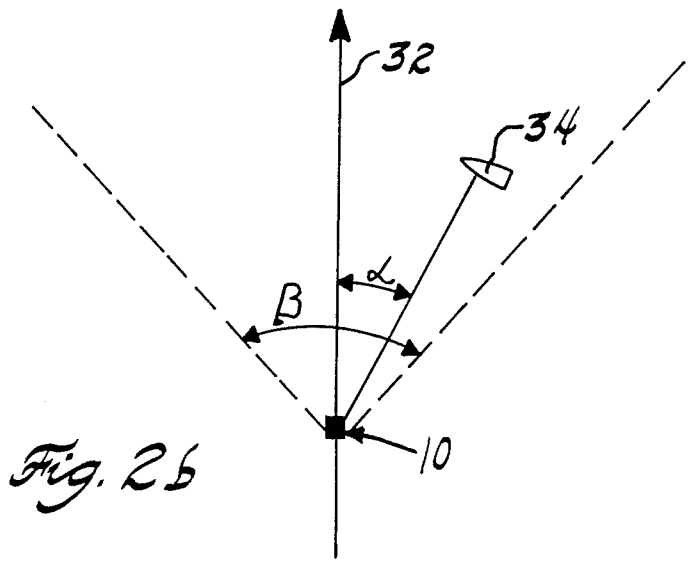
FIGS. 2(b), 2(c), and 2(d) illustrate plan views of situations wherein an alarm signal may or may not be generated.

Referring next to FIGS. 2a, 2b, the operations of the logic processing unit 18 may be further described by analysis of the scene imaged by the television camera 12. The line 32 represents an imaginary line in the scene indicating the direction of travel of a platform carrying the collision avoidance alarm system 10. For purposes of discussion, it is assumed that this platform is a watercraft. Another craft 34 appearing in the scene may be moving relative to the platform in one of several ways. It may be running parallel, closing parallel, or crossing. By appropriate optical and electronic filtering, the object in the scene may be distinguished from background. The logic processing unit 18 may then establish those patterns having substantially the same digital value and, from that pattern, a centroid and an extent may be determined. When the angle $\alpha$ from the line 32 of progression of the platform to the centroid of the object remains constant and the extent of the object appears to grow, the two craft are on a collision course.

Figure 2C:
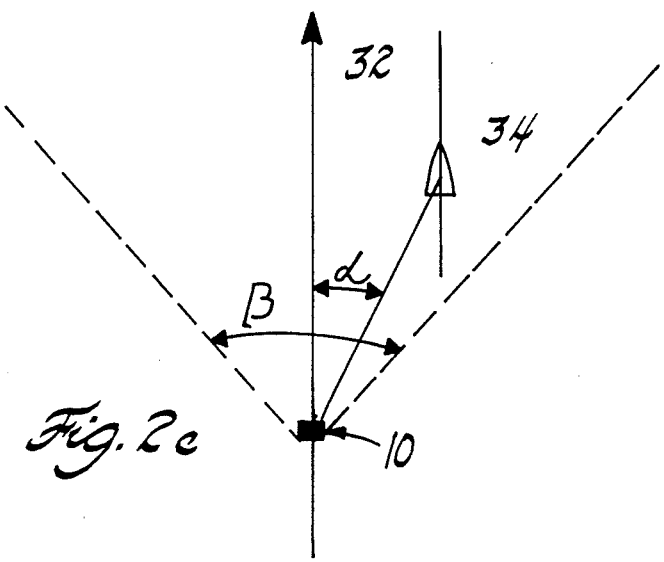

If the object is running parallel, as in FIG. 2(c), the object will maintain the angle $\alpha$ from line 32 to its centroid and; will maintain its apparent extent only if the velocities of the object and the platform are the same. Thus the criteria of potential collision do not concurrently exist. The centroid may maintain a constant angle and but the extent does not change. No alarm should be generated.

Similarly, if the object's apparent extent decreases while the angle $\alpha$ remains constant, the object is moving away relative to the platform. No alarm signal should be generated.

If the object is on a parallel course but closing relative to the platform, the extent will increase, but the angle $\alpha$ will vary. Only when the angle is zero should an alarm signal be generated.

Figure 2D:
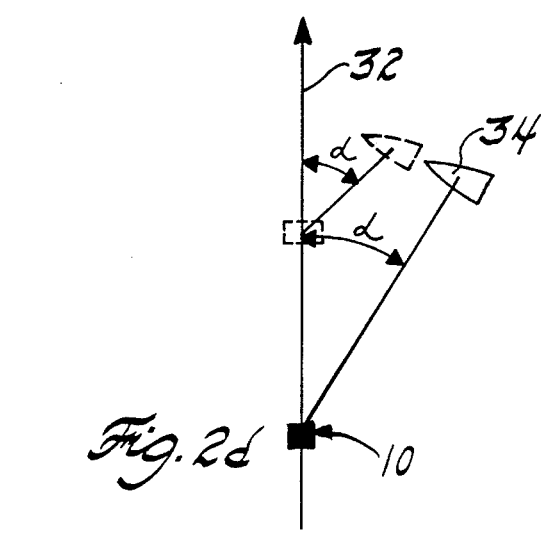

When the object is on a crossing course, the angle $\alpha$ will remain constant while the extent of the object will increase as the separation between the object and the platform decreases, as indicated in FIG. 2(d). The dotted line positions of the object 34 and the system 10 are at a time later than that shown by the solid line positions. An alarm signal should be generated.

While the foregoing description has referred to watercraft for simplicity, if the angle $\alpha$ is measured in three-dimensional space, the system of the herein invention may be utilized in aircraft.

DESCRIPTION OF ALTERNATE EMBODIMENTS

Figure 3:
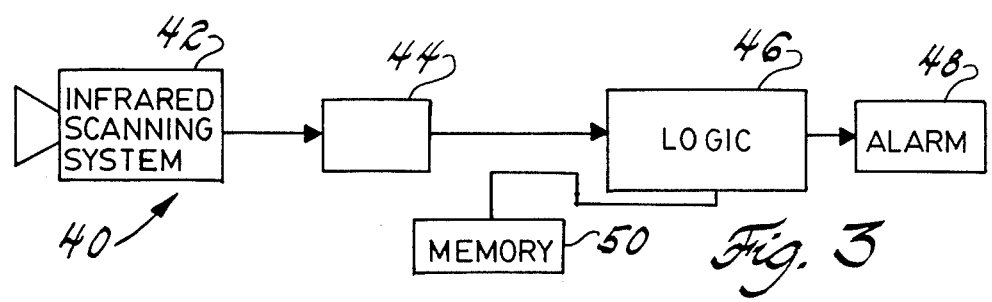
FIG. 3 is a functional block diagram of an alternate embodiment of a collision avoidance alarm system in accordance with the present invention.

Referring next to FIG. 3, a first alternate embodiment of a collision avoidance alarm system in accordance with the present invention is indicated generally at 40. The system 40 comprises an infrared scanning system 42, having a wide field of view, which directs infrared energy from an observed scene onto an infrared detector 44 such that the portion of space observed at each instant of time is identifiable, a logic processing unit 46, accepting electrical signals from the scanning system 42 and the detector 44, and processing those signals appropriately to generate a signal to an alarm 48 when potential collision criteria are met. As an adjunct to the logic processing unit 46, a memory 50 may be separately identified.

Upon receipt of infrared energy from the observed scene, the detector 44 generates an electrical signal having an amplitude proportional to the intensity of the infrared energy. The logic processing unit 46 accepts the electrical signal, together with spatial correlating electrical signals from the scanning system 42, performs threshold evaluation of the amplitude of the energy signal, compares the amplitude with an amplitude retained in the memory 50 for that particular space element, and computes a centroid of spatially contiguous like amplitude signals relative to the center of the field of view of the scanning system 42 and an extent of those signals in imaged space. Upon completion of the analysis, the imaged amplitude signals replace those retained in the memory 50.

As in the preferred embodiment, when the concurrent criteria of constant angular position of the centroid of the object relative to the center of the field of view of the scanning system 42 and an apparent growth in the extent of the imaged object generating the infrared energy are found to exist, the logic processing unit 46 causes the alarm 48 to produce an audible signal.

As a second alternate embodiment, the infrared scanning system 42 and the detector 44 of FIG. 3 may be replaced by an appropriate wide field of view detector array and optical system. Each element of the array thus provides its own address to the logic processing unit 46 and represents an element of the viewed scene. If the system is to be employed in watercraft, as in the initial example, the detector array may be linear so that, in essence, only the horizon is observed. Such simplification may dramatically reduce the complexity and cost of the system of the present invention.

A further alternate embodiment of the present invention utilizes the recognized feature of ultraviolet background that an object in near space to the detection system will mask the background and thus appear as a hole in the generally constant ultraviolet background. Detectors of ultraviolet energy are well known. In such an alternate embodiment, the logic processing unit 46 of FIG. 3 would be modified to compute the centroid of any contiguous area of the imaged scene having a significantly reduced energy signal amplitude from the detector. Similarly the extent of the "hole" is computed, rather than that of a high signal image. The collision criteria remain the concurrence of a constant angle within the field of view and an apparent growth in the extent of the contiguous object image. A further aid in distinguishing specious signals to preclude false alarms is found in the known scientific fact that the amplitude of a signal produce by an ultraviolet sensor is proportional to the ultraviolet intensity observed, coupled with the fact that the ultraviolet intensity varies proportionally with the depth of field observed.

While other alternate embodiments may be contemplated by the inventor, such as an active radar or laser system analyzing the return from observed objects, all such embodiments utilize the criteria established heretofore to determine when a collision is imminent. These systems may be further expanded to provide that the alarm 20 of FIG. 1 or the alarm 48 of FIG. 3 be of a nature such that automatic steering control signals are provided to the platform to avoid the collision.

The invention disclosed and claimed herein is not limited to the preferred or alternate embodiments shown or to the exemplary application of those embodiments to watercraft collision avoidance since modifications will undoubtedly occur to persons skilled in the art. Hence, departures may be made from the form of the present invention without departing from the principles thereof.

I claim:

1. A collision avoidance alarm system, for rigid mounting on a vehicle, comprising:
   (a) a sensor subsystem, producing electrical signals proportional to the intensity of visible light incident thereon;
   (b) lens means for directing visible light, from a wide field of view substantially centered about a direction of progression of said vehicle, onto said sensor subsystem;
   (c) means for correlatably identifying the electrical signals produced by said sensor subsystem with particular elements within the field of view of said lens system wherein the visible light sensed originates;
   (d) means for comparing the electrical signals resulting from spatially contiguous elements within the field of view, and for establishing an extent parameter, in terms of a measure within the field of view, of said resultant electrical signals having like characteristics and amplitudes;
   (e) means for computing a centroid, in terms of angle with respect to the center of the field of view, of the spatially contiguous elements on which said extent parameter is based;
   (f) means for sequentially, in time, comparing consecutive extent parameters and centroid angle; and
   (g) means for producing an audible signal when, and only when, the centroid angle is consecutively a constant and the extent parameter indicates an apparent growth.

2. The collision avoidance alarm system of claim 1, wherein said sensor subsystem and said lens means are in the form of a television camera having a field of view centered on the direction of progression of the carrying vehicle.

3. A collision avoidance alarm system, for rigid mounting on a vehicle, comprising:
   (a) means for scanning an observed scene having a wide field of view and for directing electromagnetic energy emanating from said scene there through;
   (b) means for sensing electromagnetic energy passing through said means for scanning an observed scene and for producing electrical signals proportional to the amount of energy sensed, said signals further being correlatable to spatial elements of the observed scene;

(c) means for analyzing said signals so as to establish an extent parameter of any contiguous region of the observed scene producing like signals and so as to establish an angle, with respect to the direction of progression of the vehicle, of a centroid of any such contiguous region; and (d) means for producing an alarm signal for cases when both the centroid angle remains constant and the extent parameter indicates growth over time, and for precluding the production of an alarm signal in all other cases.

4. The collision avoidance alarm system of claim 3, wherein said electromagnetic energy is in the ultraviolet portion of the spectrum.

5. The collision avoidance alarm system of claim 3, wherein said electromagnetic energy is in the visible portion of the spectrum.

6. The collision avoidance alarm system of claim 3, further comprising means for digitizing the electrical signals produced by said means for sensing electromagnetic energy and for providing said digitized signals to said means for analyzing said signals.

7. The collision avoidance alarm system of claim 3, wherein said electromagnetic energy is in the infrared portion of the spectrum.

8. The collision avoidance alarm system of claim 7, wherein said means for scanning an observed scene and said means for sensing electromagnetic energy comprise a wide field of view optical system and an array of infrared detectors, respectively.

9. The collision avoidance alarm system of claim 7, wherein said means for scanning an observed scene and said means for sensing electromagnetic energy comprise an optical system driven to oscillate through a wide field of view, and a single chopped detector, respectively.

10. A passive collision avoidance system for a vehicle comprising:

a television camera for generating a continuous analog signal corresponding to a series of raster scan frames of received light, the analog signal at a particular time of receipt relative to said raster scan frames indicative of the intensity of incident light received from a corresponding location within the field of view;

a wide angle optical system coupled to said television camera disposed to gather to said television camera ambient light from a wide field of view centered on the direction of progression of the vehicle;

an analog-to-digital convertor connected to said television camera for converting said continuous analog signal into a corresponding stream of digital signals, each digital signal indicative of the intensity of incident light from a corresponding location within the field of view of said television camera;

a memory connected to said analog-to-digital convertor for storing at least one frame of said stream of digital signals;

an alarm device for producing an audible alarm when triggered; and a logic processing unit connected to said analog-to-digital convertor, said memory and said alarm device programmed for recalling said digital signals stored in said memory, identifying objects within digital signals corresponding to frames by grouping digital signals of similar intensity of incident light, computing a centroid of location within the field of view of the television camera of each such identified object, computing a measure of the extent of each such identified object, and triggering said alarm when said centroid of an identified object is constant and said measure of extent of the same identified object is increasing.

11. The passive collision avoidance system for a vehicle as claimed in claim 10, wherein:

the light received by said television camera is infrared light.

12. The passive collision avoidance system for a vehicle as claimed in claim 10, wherein:

the light received by said television camera is ultraviolet light.

13. The passive collision avoidance system for a vehicle as claimed in claim 10, wherein the light received by said television camera is visible light.

14. The passive collision avoidance system for a vehicle as claimed in claim 10, wherein:

said wide angle optical system coupled to said television camera consists of a wide angle lens.

* * * * *

UNITED STATES PATENT AND TRADEMARK OFFICE
CERTIFICATE OF CORRECTION

PATENT NO. : 4,872,051
DATED : 10-3-89
INVENTOR(S) : Robert H. Dye

It is certified that error appears in the above-identified patent and that said Letters Patent is hereby corrected as shown below:

Column 1, line 22 "sans" should be --scans--.

Column 2, line 14 "ar" should be --are--.

Signed and Sealed this

Fifteenth Day of January, 1991

Attest:

HARRY F. MANBECK, JR.

*Attesting Officer*    *Commissioner of Patents and Trademarks*